Feb. 10, 1970   F. L. VERMETTE   3,494,463
PACKAGE BIOLOGICAL SEWAGE TREATMENT
Filed Nov. 9, 1967   2 Sheets-Sheet 1
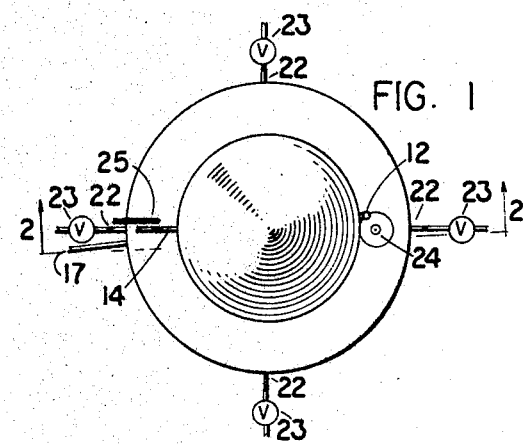
FIG. 1
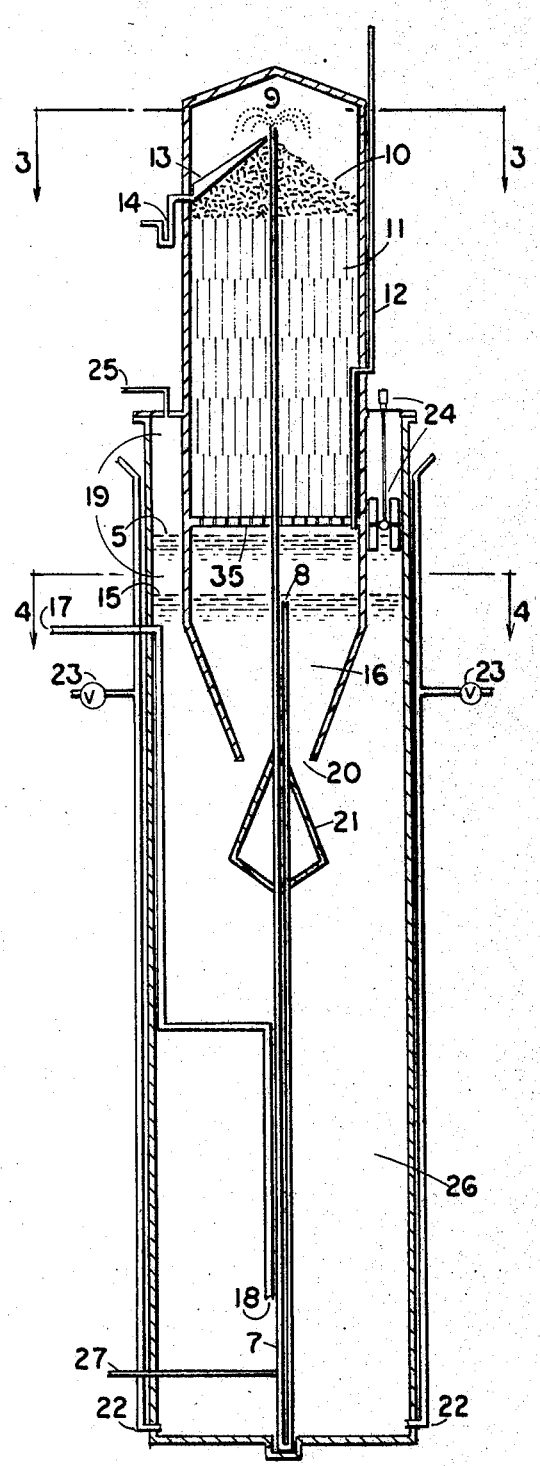
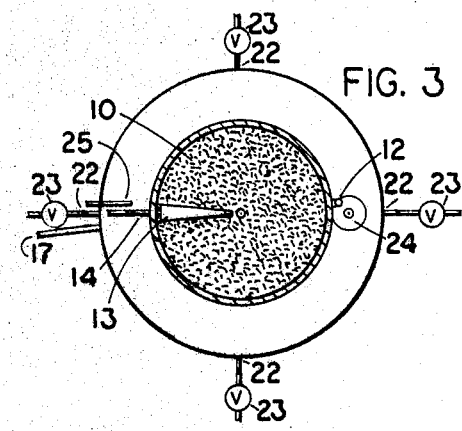
FIG. 3
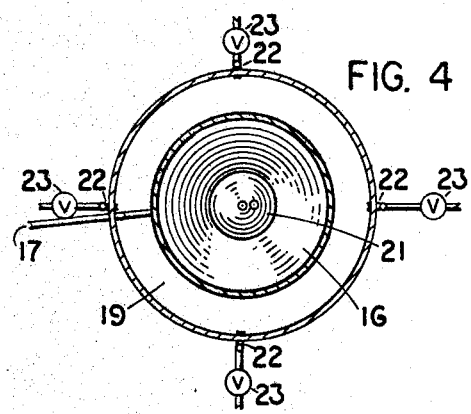
FIG. 4
FIG. 2

United States Patent Office 3,494,463
Patented Feb. 10, 1970

3,494,463
PACKAGE BIOLOGICAL SEWAGE TREATMENT
Floyd L. Vermette, 2724 Chadwick,
Pontiac, Mich. 48054
Filed Nov. 9, 1967, Ser. No. 681,809
Int. Cl. B01d 23/26
U.S. Cl. 210—124                              3 Claims

ABSTRACT OF THE DISCLOSURE

Apparatus for improving aerobic and anaerobic purification of organic liquid waste which includes aerobic treatment via trickling filter, or packed aeration tower, to which feed and recirculation is by air lift pump, and aeration is by forced draft of air after its use for pumping; and anaerobic biochemical decomposition is in lower compartment of a two-storied tank, a so-called Imhoff tank. The process can be used for treatment of domestic or industrial liquid waste, and is especially useful for treating wastes from confined farm animals.

---

This invention relates to sewage treatment apparatus. Its applicability is to separation of animal or human water transported excrement and other organic wastes from the vehicle, water. Its continued applicability is to stabilize putrescrible material so removed, by aeaerobic means.

This invention relates particularly to the use of a trickling filter, a so-called Imhoff tank, and an air lift so combined to accomplish complete sewage treatment with the least attendant operating labor and difficulty. The invention relates too to effecting said treatment with the highest degree of sanitation and the least environmental exposure. The general objective is to reduce labor and concomitant cost so that the advantages of sanitary and pleasant waste treatment and disposal are available to more situations.

Increasing world human population has caused crowding and made necessary the production of more food. Crowding of people closer to their neighbors has multiplied and intensified their waste disposal problems directly, and the production of more food and other consumers' goods has done the same more indirectly. Modern transportation plus greatly increased population has multiplied pollution situations in number in addition to size.

The production of more food has resulted in the production of more farm animals, and the development of large farm animal enterprises. Examples of such enterprises are egg, poultry, swine, beef, and dairy product production. The scale and number of such enterprises has made necessary the disposal of large quantities of excrement from confined animals. Competition, compatibility, and scale have made farm animal excrement disposal a major problem to modern food production.

It is an object of this invention to utilize a circular tank of two vertically interconnected compartments in a way especially designed to accomplish sedimentation and anaerobic sludge digestion. A two compartment tank to serve said two purposes is not new. Such tanks, known as Imhoff tanks, are common. The circular shape with peripheral gas vent is less common, however.

A further object of this invention is to accomplish both primary and secondary settling in the top compartment of the above tank. Settling of solids from the influent sewage, and settling of solids rendered settleable by aerobic biological activity in a trickling filter above the tank, simultaneously and in a single compartment is the meaning here.

A further object of this invention is to recirculate settled and partially settled trickling filter effluent to trickling filter influent via an air lift pump.

A further object of this invention is to utilize the air expelled from said air lift pump for forced aeration of trickling filter media, tower packing.

A further object of this invention is to expel, by use of a conduit, the air already twice used at an elevation above buildings served. It is preferable this treatment device be housed in the building served, or in one of the buildings served. It is also preferable that the air used for air lift and trickling filter ventilation be building ventilation air effluent. This conserves heat and promotes winter biological activity.

A further object of this invention is to trap for use, the combustible gas which results from the anaerobic decomposition in the lower compartment referred to above.

A further object of this invention is to break scum in a circular peripheral gas vent by rotating the contents horizontally with a paddle wheel type scum breaker.

In the modification designed for confined animal excrement treatment an object of this invention is to utilize treated effluent to convey fresh excrement back to treatment device in a closed circuit. In this way all final effluent other than digested sludge for fertilizer is eliminated.

A further object of this invention is to discharge effluent at a higher elevation than that of influent. The invention acts thus, in a dual capacity; as a treatment device and as a liquid lifting device, without auxiliary pumping equipment.

FIG. 1 is a top plan view of water-waste separation and waste stabilization apparatus of the present invention.

FIG. 2 is a vertical section along the line 2—2 of the sewage treatment apparatus of FIG. 1.

FIG. 3 is a horizontal section of the apparatus of FIG. 1 taken on line 3—3 of FIG. 2.

FIG. 4 is a horizontal section of apparatus of FIG. 1 taken on line 4—4 of FIG. 2.

Figures 5, 6:
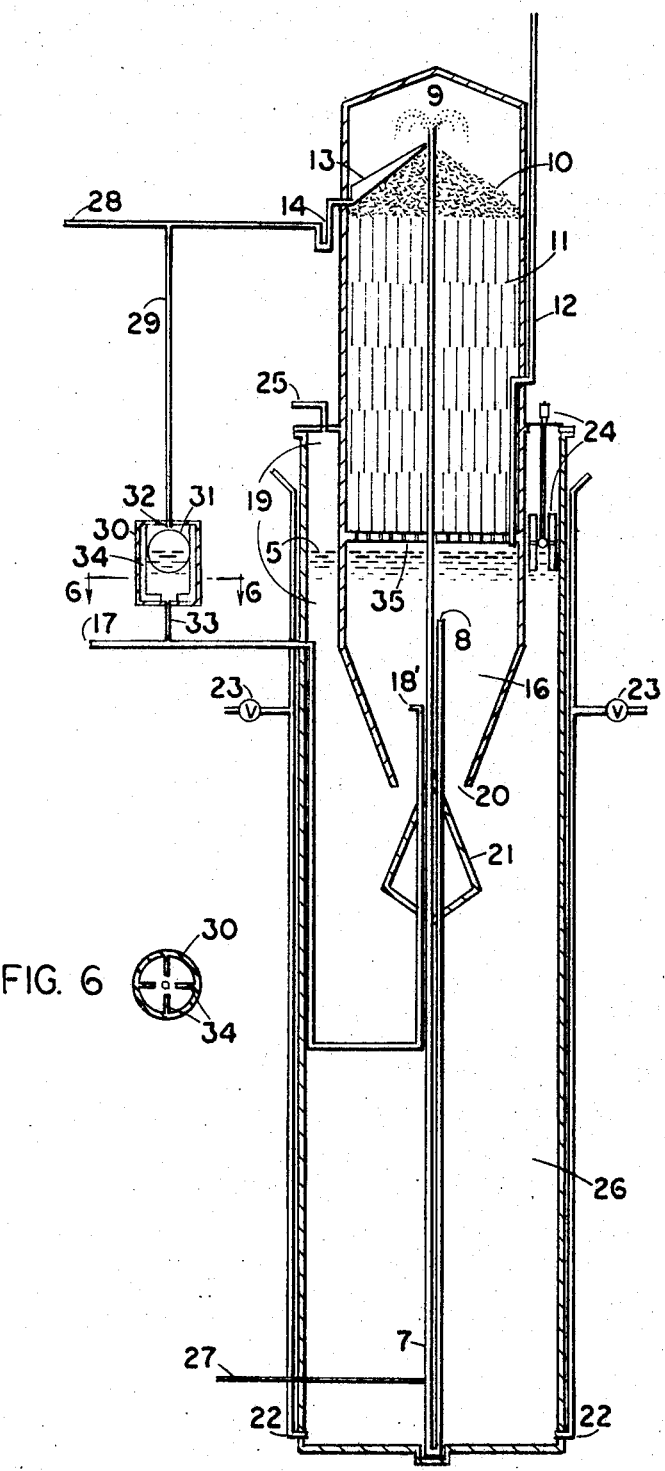
FIG. 5 is a vertical section of a modified form of the invention, in which the influent pipe is modified, and provision is made for return of some effluent to the influent pipe to facilitate almost constant water level elevation in treatment apparatus.
FIG. 6 is a horizontal section of return rate controller taken on line 6—6 of vertical section of that device, a part of FIG. 5.

Referring to the drawing as applied to farm animal waste disposal, it is supposed the animals are reared on slatted floors with manure pit or trough below. The animals may be reared with manure collection in gutter as with dairy cattle, or manure collection may be on floor below wire as with poultry. In any event, waste should be in trough, ditch, pit, or on sloping floor, so it may be flushed away by a rush of water.

To start the farm animal version of this treatment device as pictured in FIG. 2, it is filled with water to high water level 5. Air is pumped in through pipe 27 into air lift riser pipe 7. This starts the operation of an air lift pump with intake at 8 and discharge at 9. Nearly all the water raised by the air lift pump trickles downward through random tower packing 10 and modular tower packing 11 and support grating 35. Random tower packing 10 is primarily to cause even horizontal distribution of liquid when applied to modular packing 11. Examples of such random packing are Raschig Rings or Pall Rings as manufactured by U.S. Stoneware, Inc. of Akron, Ohio. Example of modular packing is Surfpac as manufactured by Dow Chemical Co. of Midland, Michigan. The air expelled with liquid from air lift at 9 also passes downward through packings 10 and 11 and packing support grating 35, and is expelled through exhaust pipe 12. That small fraction of liquid which falls on collector trough 13 is conveyed away through trap 14 to a dosing chamber, not shown, Said dosing chamber contains one, two, or more siphons. Example of siphon is Type "A" Plural Alternating Siphons in literature of Pacific Flush Tank Co. of Chicago, Ill. The number of siphons in dosing chamber is determined by the number of manure collection troughs or other places which must be intermittently flush cleaned. The dosing chamber doses a volume at each discharge equal to volume between low water level 15 and high water level 5 of the treatment apparatus. The water which passes downward through tower packings 10 and 11 and grating 35 is returned to sedimentation chamber 16 and recirculated through intake 8 and air lift riser 7 to discharge at 9 to again have a very small fraction removed to dosing chamber. Dosing chamber effluent with waste flushed from manure pit or trough or floor enters separation and treatment device through pipe 17, and is conveyed to sludge digestion compartment at 18. At each dosing the water level is raised from low water level 15 to high water level 5 to repeat the overall operating cycle of flushing waste to separation and treatment device.

While the dosing chamber is being filled via collector trough 13, trap 14, and piping not shown, the liquid level is very slowly lowered from high water level 5 to low water level 15. While net water in sedimentation compartment 16 is being reduced, level in gas vent 19 outside sedimentation compartment 16 is also being lowered via circular slot 20 to sedimentation compartment 16. The rate of upward flow through circular slot 20 is maintained low enough to allow countercurrent solids settling. This rate of flow is regulated by the smallness of the fraction of filter area, top surface of random packing 10, intercepted by collector trough 13.

When siphon doses and waste, by water, is washed in via pipe 17, and enters sludge digestion compartment 26 at 8, there results a rapid rise in water level from 15 to 5. There results also a rapid movement of supernatant liquor from sludge digestion compartment 26 through slot 20 into sedimentation compartment 16. Immediately upon the cessation of the dosing cycle, and when the liquid has reached high water level 5, a very slow upward flow through slot 20 is resumed and solids again settle countercurrent into digestion compartment 26. Solids which, by anaerobic activity, rise and resettle within digeston compartment 26 and gas vent 19 are diverted away from slot 20 by double conical baffle 21.

Influent is caused to enter in a downward direction at 18 to prevent the accumulation of dead digested or otherwise inert solids at center bottom of sludge digestion compartment. Digested sludge drawoff is by pipes 22 from periphery of bottom of sludge digestion compartment.

Digested sludge may be withdrawn by operation of valves 23, to digested sludge disposal facility, not shown. Sludge disposal facility may be drying bed, lagoon, tank truck, vacuum filter, or the like.

To prevent accumulation of heavy scum in the gas vent 19, a scum breaker 24 is installed in gas vent 19. Gas vent is circular and without obstructions to circular horizontal rotation of its contents. Scum breaker is a paddle wheel electrically driven by motor from above. The action of the paddle wheel scum breaker 24 is to submerge, wet, and rotate the scum ring in gas vent, so that all is agitated while liquid is at or near high level 5. Gas trapped above liquid level in gas vent 19 is withdrawn for use in heating etc. through pipe 25.

Referring to FIG. 5 wherein modifications allow for more constant influent flow rate, the following sequence of operating process holds forth. It will be noted that influent pipe termination point is modified, and flow return controller is added to maintain relatively constant water level in treatment device.

In starting, liquid influent is allowed to enter through pipe 17 into sedimentation compartment horizontally at 18'. When liquid has risen to near water level 5, air is pumped in through pipe 27 into air lift riser pipe 7. This starts operation of air lift pump with intake at 8 and discharge at 9. Nearly all of the water raised by air lift trickles downward through random tower packing 10 and modular packing 11 and support grating 35.

The air expelled with liquid from air lift at 9 also passes downward through packing and grating and is expelled through exhaust pipe 12. That small fraction of liquid which falls on collector trough 13 is conveyed away through trap 14 and pipe 28 unless collector trough 13 is collecting more than influent flow rate in pipe 17. In this case some effluent is diverted through pipe 29 by flow return controller 30 to maintain liquid level 5 almost constant as shown. Design requires that collector trough 13 intercept a flow equal to or slightly greater than maximum expected influent flow rate.

Flow return controller is actuated by liquid level 5. As liquid level begins to drop, hollow floating rubber ball 31 drops away from seat 32 at lower end of pipe 29. This allows effluent to be diverted from pipe 28 through pipe 29 and flow return controller 30 and pipe 33 to influent pipe 17. When floating rubber ball 31 is not held tightly against seat 32, water flows freely around ball by passing between guide vanes 34.

Digested sludge is withdrawn as in FIG. 2 modification.

Because liquid level 5 is constant in FIG. 5 version, scum breaker 24 is operable and effective continuously to rotate contents of gas vent and submerge and wet and cause to digest, any scum formation.

The foregoing specification sets forth the invention in its preferred practical forms, but the structure shown is capable of modifications within a range of equivalents without departing from the invention which is to be understood is broadly novel.

The embodiments of the invention in which an exclusive property or privilege is claimed are defined as follows:

1. Sewage treatment apparatus including an enclosed settling tank having vertically descending and inwardly inclined baffle means positioned in the upper section thereof forming an outer chamber and an inner chamber, a hermetically enclosed biological trickling filter positioned above said inner chamber and having a lower grating in direct communication with said inner chamber, a filtering material positioned on said grating and substantially filling said trickling filter, an air lift pump having an inlet for liquid positioned in said inner chamber and an outlet for liquid and air positioned in the upper part of said trickling filter, an inlet for sewage to be settled in said settling tank and separate outlet means for the separated and treated materials, whereby liquids and solids are substantially separated in said settling tank and separated liquid is combined with air and pumped to the upper section of said trickling filter for return by gravity through said filter material to said settling tank, said outer chamber collecting gaseous products biologically generated from said sewage.

2. The apparatus of claim 1 further including a conduit in communication between said settling tank and said trickling filter having a float type flow controller positioned therein for maintaining a substantially constant level in said tank.

3. The apparatus of claim 1 further including a paddle wheel type scum breaker positioned in said outer chamber.

References Cited

UNITED STATES PATENTS

| | | | |
|---|---|---|---|
| 1,415,007 | 5/1922 | Ball | 210—188 X |
| 1,851,030 | 3/1932 | Adams | 210—188 |
| 1,987,888 | 1/1935 | Babbitt et al. | 210—188 X |
| 2,008,507 | 7/1935 | Laughlin | 210—151 |
| 2,366,917 | 1/1945 | Levine | 210—151 X |
| 2,520,540 | 8/1950 | Green | 210—188 X |
| 2,553,228 | 5/1951 | Yonner | 210—151 |
| 3,010,581 | 11/1961 | Knapp et al. | 210—151 |
| 3,291,309 | 12/1966 | Hutchison | 210—151 |

SAMIH N. ZAHARNA, Primary Examiner

J. W. ADEE, Assistant Examiner

U.S. Cl. X.R.

210—128, 151